United States Patent
Rofougaran et al.

(10) Patent No.: US 12,500,659 B1
(45) Date of Patent: Dec. 16, 2025

(54) REPEATER SYSTEM AND METHOD OF PRE-CALIBRATING REPEATER DEVICES USING PSEUDO-SSB SIGNAL

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Milan Rofougaran, Newport Coast, CA (US); Arman Rofougaran, Newport Coast, CA (US); Puya Rofougaran, Irvine, CA (US); Kavian Odabaee, Newport Coast, CA (US)

(73) Assignee: PELTBEAM INC., Sherman Oaks, CA (US)

( * ) Notice: Subject to any disclaimer, the term of this patent is extended or adjusted under 35 U.S.C. 154(b) by 0 days.

(21) Appl. No.: 19/232,977

(22) Filed: Jun. 10, 2025

(51) Int. Cl.
*H04B 7/155* (2006.01)
*H04L 5/00* (2006.01)

(52) U.S. Cl.
CPC ....... *H04B 7/15507* (2013.01); *H04L 5/0048* (2013.01)

(58) Field of Classification Search
CPC .......... H04B 7/15507; H04L 5/0048
USPC ........................................... 455/7
See application file for complete search history.

(56) References Cited

U.S. PATENT DOCUMENTS

| | | | |
|---|---|---|---|
| 2019/0020402 A1* | 1/2019 | Gharavi | H04B 7/1555 |
| 2020/0403689 A1* | 12/2020 | Rofougaran | H04W 52/367 |
| 2022/0094423 A1* | 3/2022 | Patel | H04B 7/15535 |
| 2024/0159855 A1* | 5/2024 | Saini | H04W 64/003 |
| 2025/0081057 A1* | 3/2025 | Bai | H04B 7/15528 |

* cited by examiner

*Primary Examiner* — Juan A Torres
(74) *Attorney, Agent, or Firm* — CHIP LAW GROUP

(57) ABSTRACT

A repeater system includes a first repeater device that includes a first processor that sets the first repeater device as a source of a Synchronization Signal Block (SSB) signal independent of gNB. The first processor generates a pseudo-SSB signal before establishing any connection with the gNB in a pre-connection stage. The first processor further steers the pseudo-SSB signal across multiple directions to cover a sector of the first repeater device when the first repeater device is set as the source of the SSB signal. The first processor receives feedback including a plurality of signal assessment parameters from a second repeater device based on the pseudo-SSB signal received at the second repeater device. The first processor pre-calibrates the first repeater device and establishes a wireless link with the second repeater device in the pre-connection stage independent of the gNB, based on the feedback received from the second repeater device.

20 Claims, 6 Drawing Sheets ns. More spe-
REPEATER SYSTEM AND METHOD OF PRE-CALIBRATING REPEATER DEVICES USING PSEUDO-SSB SIGNAL

CROSS-REFERENCE TO RELATED APPLICATIONS/INCORPORATION BY REFERENCE

None

FIELD OF TECHNOLOGY

Certain embodiments of the disclosure relate to wireless communication networks and repeater systems. More specifically, certain embodiments of the disclosure relate to a repeater system and a method of pre-calibrating repeater devices (e.g., 5G-enabled repeater devices) using pseudo-Synchronization Signal Block (SSB) signal for high-performance communication with rapid mesh network set up at the time of deployment.

BACKGROUND

In modern wireless communication networks, particularly those utilizing millimeter wave frequencies such as 5G networks, the deployment and calibration of repeater networks present significant challenges. Traditional methods often require the presence of an actual gNodeB (5G base station) to generate synchronization signal block (SSB) signals. Alternatively, conventional test equipment that generates certain millimeter wave signals for testing and calibration purposes is not only prohibitively cost-intensive (e.g., more than $200,000 USD) but also presents several technical challenges. For example, such conventional test equipment is large and not designed for easy transportation or use in field conditions, limiting their practicality for on-site or off-site testing and calibration. Further, such conventional high-end test equipment often has significant power demands, due to high-speed analog-to-digital converters and powerful processors, which can be challenging to meet in field deployment scenarios. Furthermore, such conventional test equipment has high complexity and requires specialized training for operation, limiting the pool of technicians who can effectively use them. Other issues may be limited flexibility to adapt to different testing scenarios, scalability issues in large-scale network testing, frequency range limitations used in advanced millimeter wave communications, potentially requiring multiple devices for comprehensive testing. The conventional systems and methods also frequently necessitate on-site visits to private properties or hard-to-access locations for signal testing and network optimization. These requirements lead to several issues in the field. The high costs associated with conventional test equipment and on-site testing create significant financial barriers to efficient network deployment and maintenance. Further, to transmit millimeter wave signals, a license is required from a regulatory agency (e.g., Federal Communications Commission (FCC)). However, in practice, transmission approvals are not feasible during the product development phase. This regulatory hurdle further complicates testing and deployment processes, adding another layer of complexity to an already challenging landscape. Pre-deployment testing and verification thus become challenging without access to actual network conditions, regulatory hurdles, or expensive test equipment. This, in turn, hinders the ability to rapidly prototype and deploy repeater networks, especially in new or changing environments.

Furthermore, testing network configurations in various environments without physical presence poses a substantial challenge. This limitation restricts the ability to optimize network performance for specific locations or to troubleshoot issues remotely, leading to increased deployment times and operational costs. Furthermore, current analog repeater systems, which operate by amplifying and forwarding signals without digitization, face unique challenges in maintaining synchronization and calibration across the network. Unlike digital systems that can decode and process signal content, analog systems require alternative methods to ensure proper signal propagation and network performance. This characteristic of analog systems further complicates the task of network optimization and maintenance, especially in complex or dynamic environments.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A repeater system and a method of pre-calibrating repeater devices (e.g., 5G-enabled repeater devices) using pseudo-Synchronization Signal Block (SSB) signal for high-performance communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a repeater system and a method of pre-calibrating repeater devices using pseudo-Synchronization Signal Block (SSB) signal for high-performance communication and improved pre-deployment testing and verification. By conducting this pre-calibration in a pre-connection stage, independent of a gNB, the disclosed system may allow for efficient network setup and troubleshooting before integrating with the actual 5G infrastructure. This approach may result in more reliable and optimized repeater networks upon final deployment, potentially reducing post-installation adjustments and improving the overall quality of service. Furthermore, this self-calibrating capability may enhance the flexibility and scalability of 5G network deployments, allowing for easier expansion and adaptation to changing network demands or environmental conditions. Additionally, a practical benefit of the disclosed system is that licensed-band transmissions can be conducted under a "Federal Communications Commission (FCC) Experimental Radio Station Construction Permit and License," for testing and development, which is significantly easier and faster to obtain than traditional transmission approvals. This regulatory advantage, combined with the use of control pseudo-frames (e.g., the pseudo-SSB signal) streamlines the development process using the disclosed system and method unlike the conventional systems that complicate testing and deployment processes as transmission approvals for millimeter wave signals are not generally feasible during the product development phase. Thus, the present disclosure enables developers to conduct legitimate, authorized testing in real-world conditions without the extensive delays typically associated with mmWave transmission licensing. This streamlined regulatory compliance represents a meaningful practical benefit for accelerating development timelines while maintaining full legal authorization for field testing activities.

In the following description, reference is made to the accompanying drawings, which form a part hereof, and in which are shown, by way of illustration, various embodiments of the present disclosure.

Figure 1:
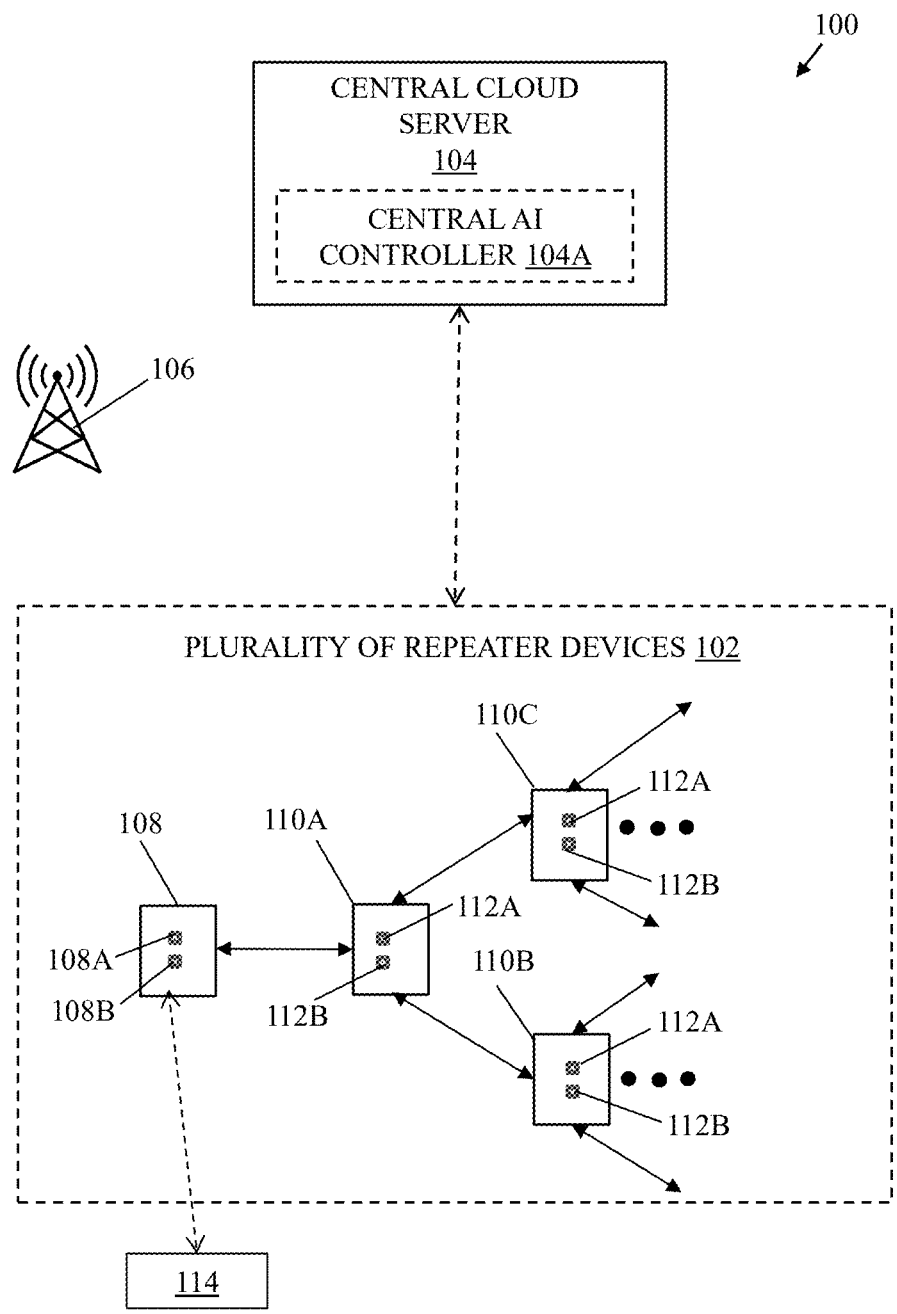
FIG. 1 is a diagram that illustrates a network environment of an exemplary repeater system, in accordance with an exemplary embodiment of the disclosure.

FIG. 1 is a diagram that illustrates a network environment of an exemplary repeater system, in accordance with an exemplary embodiment of the disclosure. With reference to FIG. 1, there is shown a repeater system 100. The repeater system 100 may include a plurality of repeater devices 102. There is further shown a central cloud server 104 and a gNode base station (gNB) 106. The central cloud server 104 may include a central artificial intelligence (AI) controller 104A. In an implementation, one or more repeater devices (e.g., a first repeater device 108) of the plurality of repeater devices 102 may be communicatively coupled to the central cloud server 104. In some implementations, all of the repeater devices (e.g., the first repeater device 108, a second repeater device 110A, a third repeater device 110B, a fourth repeater device 110C, and the like) may be communicatively coupled to the central cloud server 104. There is further shown an external electronic device 114 that may be communicatively coupled to the first repeater device 108.

The plurality of repeater devices 102 may include two different types of repeater devices, i.e., the first type of repeater devices (e.g., the first repeater device 108) and the second type of repeater devices (the second repeater device 110A, the third repeater device 110B, and the fourth repeater device 110C). The first type of repeater devices may be special-purpose repeater devices that may be designed and configured to have the capability to generate pseudo-Synchronization Signal Block (SSB) signals. The second type of repeater devices may not have the capability or may not be required (or configured) to generate the pseudo-SSB signals and may utilize the pseudo-SSB signals generated by the first type of repeaters for a network-wide calibration and synchronization of the plurality of repeater devices 102. In the repeater system 100, the number of the first type of repeater devices may be less than the second type of repeater devices. The second type of repeater devices may be "grab and amplify" or "grab and forward" repeater devices, which may capture a radio frequency (RF) signal (e.g., a 5G signal), amplify, and forward the signal to a next mesh node without demodulating the payload, i.e. the user data, in the RF signal. Examples of the plurality of repeater devices 102 may include, but may not be limited to, an XG-enabled repeater device or an XG-enabled edge communication device, where the XG corresponds to 5G or 6G communication.

The central cloud server 104 includes suitable logic, circuitry, and interfaces that may be configured to communicate with the plurality of repeater devices 102. In an example, the central cloud server 104 may be a remote management server that is managed by a third party different from the service providers associated with the gNB 106. In another example, the central cloud server 104 may be a remote management server or a data center that is managed by a third party, or jointly managed, or managed in coordination and association with one or more of a plurality of different wireless carrier networks (WCNs) or network operators, such as a WCN associated with the gNB 106. In an exemplary implementation, the central cloud server 104 may be a master cloud server or a master machine that is a part of a data center that controls an array of other cloud servers communicatively coupled to it for load balancing, running customized applications, and efficient data management.

In operation, the first processor 108A of the first repeater device 108 may be configured to set the first repeater device 108 as a source of a Synchronization Signal Block (SSB) signal independent of the gNB 106. The first repeater device 108 may include a pseudo-SSB generator, which may be activated to initiate the process of the generation of a pseudo-SSB signal, which is compliant with a 5G New radio (NR) synchronization signal waveform. The first repeater device 108 may act as a synchronization source in a network when the first repeater device 108 is set as the source of the SSB signal instead of the gNB 106. In an example, the SSB generator may be implemented in a Field-Programmable Gate Array (FPGA).

The first processor 108A of the first repeater device 108 may be further configured to generate a pseudo-SSB signal before establishing any connection with the gNB 106 in a pre-connection stage when the first repeater device 108 is set the source of the SSB signal instead of the gNB 106. The pseudo-SSB signal may refer to a Synchronization Signal Block (SSB) that is generated by a device like the first repeater device 108 other than the primary base station (i.e., the gNB in 5G) but mimics the characteristics and functions of a real 5G SSB (generated by gNB) but with capability of allowing modification of some parameters for enhanced testing of network without the involvement of any 5G base station, like the gNB 106. The pseudo-SSB signal may include a Primary Synchronization Signal (PSS) and a Secondary Synchronization Signal (SSS). In some cases, the pseudo-SSB may further include Physical Broadcast Channel (PBCH). The pseudo-SSB generator after activation may be executed to generate the pseudo-SSB signal. The generated PSS, SSS, and PBCH may be mapped to the appropriate time-frequency resources within the pseudo-SSB structure. In accordance with an embodiment, the pseudo-SSB signal may comprise encoded parameters including a pseudo physical cell identifier, a beam identifier, a channel bandwidth parameter, a timing information parameter, and a transmit (Tx) power level. The encoded parameter of the pseudo physical cell identifier may provide physical cell identification and the encoded parameter of the beam identifier may associate each SSB instance to one beam direction. The encoded parameter of the channel bandwidth parameter may provide information about the bandwidth configuration of a channel of the carrier being used or simulated for testing and may be used by the second repeater device 110A to understand the resource allocation and frequency domain structure enabling proper decoding and processing of the signal by defining the number of resource blocks and subcarrier spacing. The encoded parameter of the timing information parameter may be used for synchronization and may provide System Frame Number (SFN), which may be used to establish the current frame within the overall system timing. The timing information allows the second repeater device 110A to synchronize their internal timing with the network, e.g., a mesh network of repeater devices, understand when to expect subsequent SSBs or other control information, and prepare for proper scheduling of uplink and downlink transmission. The encoded parameter of the Tx power level may provide information about the power at which the pseudo-SSB may be transmitted. The encoded parameters allow the first repeater device 108 to simulate different network conditions and configurations without an actual connection to a gNB, such as the gNB 106. The encoded parameters may enable testing of various scenarios, such as different bandwidths, timing configurations, and power levels, to optimize the repeater network before actual deployment. Such information helps in assessing link quality, coverage, and potential interference in a mesh network of repeaters. It further allows other repeaters or devices to properly interpret and respond to the pseudo-SSB as if it were coming from a real gNB, facilitating pre-deployment testing and configuration.

In an implementation, the second repeater device 110A and each of the other repeater devices of the plurality of repeater devices 102 may be configured to specifically listen to the pseudo-SSB signal to avoid interference between the pseudo-SSB signal and standard SSBs from any nearby gNBs, such as the gNB 106. For example, specific frequency ranges for pseudo-SSB signals may be allocated that may be distinct from those used by standard SSBs from any gNBs, such as the gNB 106. These predefined frequencies may be chosen to minimize overlap with standard SSB frequencies while still being within the operational band of the 5G network for the testing and calibration purpose of the plurality of repeater devices 102. In another implementation, in practice, the location where testing and calibration of the plurality of repeater devices 102 may be done may not receive any signal from any gNBs (i.e., pre-deployment testing and calibration may be done in areas where the gNB's signal is weak or non-existent.)

The first processor 108A of the first repeater device 108 may be further configured to steer the pseudo-SSB signal across multiple directions to cover a sector of the first repeater device 108 when the first repeater device 108 is set as the source of the SSB signal. The first repeater device 108 may utilize a beamformer coupled to the pseudo SSB generator to steer the pseudo-SSB signal across multiple directions. The steering of the pseudo-SSB signal across multiple directions may be implemented using a phased array antenna controlled by the first processor 108A (e.g., an FPGA or a DSP) that generates the pseudo-SSB signal. The beamformer may adjust the phase and amplitude of the signal at each antenna element to create a directional beam that can be electronically steered. The steering the pseudo-SSB signal across multiple directions may be done to simulate the behavior of an actual gNodeB, which typically uses beam sweeping to cover its entire sector. The steering the pseudo-SSB signal across multiple directions by the first repeater device 108 may ensure that all potential repeaters in the vicinity may receive the pseudo-SSB signal, regardless of their position relative to the first repeater device 108 and allow for the discovery and initial alignment of other repeaters in the network. By steering the signal across multiple directions, the repeater system 100 may ensure that all potential repeaters in the area may be reached, even if their exact locations are unknown and a quick discovery and initial beam alignment may be done among the plurality of repeater devices 102 without requiring precise positioning information beforehand.

In accordance with an embodiment, the second repeater device 110A may comprise the second processor 112A and the second AI-based controller 112B. The second processor 112A may be further configured to decode the pseudo-SSB signal received from the first repeater device 108, extract encoded information from the pseudo-SSB signal, and pass extracted parameters to the second AI-based controller 112B to interpret the extracted parameters and generate the plurality of signal assessment parameters. The second processor 112A may be configured to decode the pseudo-SSB signal received from the first repeater device 108 using standard SSB decoding techniques, which may involve correlating the received signal with known SSB patterns and extracting embedded information such as the pseudo physical cell identifier, beam identifier, channel bandwidth, timing information, and transmit power level. The decoded information may then be passed to the second AI-based controller 112B, which may be an artificial intelligence or machine learning system implemented on the repeater's hardware. The second AI-based controller 112B may interpret the extracted parameters and generate a plurality of signal assessment parameters, which may include, for example, an angle of arrival, received signal strength, timing offset, frequency offset, and additional test parameters like signal propagation environment information, signal-to-noise ratio, bit error rate, and polarization information. The decoding and AI-based interpretation may be done to assess the quality and characteristics of the received pseudo-SSB signal, enabling the second repeater device 110A to provide comprehensive feedback to the first repeater device 108. The decoding and AI-based interpretation may allow for sophisticated analysis and optimization of the repeater network, improving link quality, facilitating adaptive beamforming, and enabling efficient self-organization of the repeater mesh network without relying on a gNB, such as the gNB 106. The second AI-based controller 112B enables real-time adaptation to changing environmental conditions, predictive maintenance capabilities, and continuous optimization of network performance.

In accordance with an embodiment, the second repeater device 110A may be further configured to estimate channel properties and a location of the first repeater device 108 based on the pseudo-SSB signal decoded at the second repeater device 110A. The estimation may be performed by analyzing various characteristics of the received pseudo-SSB signal, such as signal strength, angle of arrival, timing offset, and frequency offset. In an implementation, the second processor 112A, in conjunction with the second AI-based controller 112B, may use advanced signal processing techniques to determine the channel properties, which may include path loss, multipath effects, fading characteristics, and potential obstacles. The location estimation may be achieved through triangulation or other positioning algorithms based on the angle of arrival and signal strength information. This process may be useful for several reasons: it allows the second repeater device 110A to optimize its beam alignment towards the first repeater device 108, enables efficient resource allocation, and facilitates the creation of a self-organizing mesh network. Further, by accurately estimating the channel properties and location of other repeaters, the repeater system 100 may create a dynamic map of the network topology, which may be used for network planning, maintenance, and optimization, all without relying on external positioning systems or a connection to the gNB 106.

In accordance with an embodiment, the second repeater device 110A may be further configured to transmit a response pseudo-SSB signal as the feedback back to the first repeater device 108. The response pseudo-SSB signal may be generated by the second processor 112A and may contain encoded information about the signal assessment parameters and channel properties estimated by the second repeater device 110A. The second repeater device 110A may use its own beamformer to steer this response signal towards the estimated location of the first repeater device 108. This bidirectional exchange of pseudo-SSB signals may be used for establishing a robust wireless link between the repeater devices in the pre-connection stage, independent of the gNB 106. The response signal may allow the first repeater device 108 to assess the quality of its transmission from the perspective of the second repeater device 110A, enabling it to fine-tune its own transmission parameters. This process may facilitate a more accurate calibration of the wireless link, as both the repeater devices may adjust their settings based on reciprocal feedback. By the transmission of the response pseudo-SSB signal as the feedback back to the first repeater device 108, an improved beam alignment accuracy, enhanced link quality through mutual optimization, and a self-calibrated mesh network may be achieved among multiple repeater devices. Furthermore, this bidirectional pseudo-SSB exchange may enable the repeater devices to perform time division duplex (TDD) synchronization without relying on an external time source, which may be useful for maintaining efficient and interference-free communication within the repeater network.

The first processor 108A of the first repeater device 108 may be further configured to receive a feedback comprising a plurality of signal assessment parameters from a second repeater device 110A based on the pseudo-SSB signal received at the second repeater device 110A. The feedback may be transmitted as part of the response pseudo-SSB signal or through a separate communication channel. For example, the plurality of signal assessment parameters may include angle of arrival, received signal strength, timing offset, frequency offset, and additional test parameters such as signal-to-noise ratio, bit error rate, and channel quality indicators. The first processor 108A may process this feedback and pass it to the first AI-based controller 108B for interpretation and analysis. The receipt of the detailed feedback may allow the first repeater device 108 to gain a comprehensive understanding of how its' transmitted pseudo-SSB signal propagates and is received by other repeater devices like the second repeater device 110A, in the repeater network. The first repeater device 108 may fine-tune its transmission parameters, such as beam steering angles and transmit power levels, to optimize the wireless link with the second repeater device 110A, based on the feedback. By leveraging this feedback mechanism, the repeater system 110 may achieve more precise beam alignment, improved signal quality, and enhanced overall network performance. The ability to make data-driven adjustments based on real-world propagation conditions allows the repeater system 100 to adapt to various environmental challenges and maintain optimal connectivity without relying on external calibration equipment or the gNB 106. This self-optimizing capability significantly simplifies network deployment and maintenance processes, reducing operational costs and improving the scalability of the repeater network.

In accordance with an embodiment, the plurality of signal assessment parameters in the feedback may comprise two or more of an angle of arrival, a received signal strength, a timing offset, or a frequency offset. Additionally, the plurality of signal assessment parameters may further comprise additional test parameters including two or more of: signal propagation environment information including signal reflection information and signal obstruction information, a signal-to-noise ratio, a bit error rate, polarization information indicative of a polarization type of received signal, a channel quality indicator, a path loss, phase shift information, a delay spread, a jitter, a modulation error ratio indicative of an assessment of a deviation of the received signal from an expected modulation scheme, a packet loss rate, a link latency indicative of a time delay in a signal propagation between two repeaters, an interference level, a spectral efficiency, a beamforming feedback, a doppler shift when one of the first repeater device 108 or the second repeater device 110A is movable, or an error vector magnitude.

In accordance with an embodiment, the plurality of signal assessment parameters in the feedback may comprise a comprehensive set of metrics that may provide detailed insights into the wireless link quality and propagation characteristics between the first repeater device 108 and the second repeater device 110A. For example, the angle of arrival may be used in optimizing beam alignment, while received signal strength may guide power adjustment decisions. The timing and frequency offsets may be used for maintaining network synchronization. The additional test parameters may further enhance the system's ability to adapt and optimize performance. The signal propagation environment information, including reflection and obstruction data, may allow the repeater devices to adjust to specific deployment scenarios. The signal-to-noise ratio and bit error rate may provide link quality metrics. The polarization information may be utilized to optimize dual-polarization transmission capabilities. The channel quality indicators and spectral efficiency may guide modulation and coding scheme selections. The path loss and phase shift information may be used in understanding signal degradation and multipath effects. The delay spread and the jitter may be used for addressing challenges in time-sensitive applications. The modulation error ratio may offer insights into signal quality at the modulation level. The packet loss rate and link latency may be useful for assessing overall network performance. The interference levels may guide frequency planning and power control decisions. The beamforming feedback may allow continuous refinement of beam patterns. The doppler shift considerations may enable adaptation to scenarios involving repeaters' mobility. Lastly, the error vector magnitude may provide a comprehensive measure of signal quality. These parameters, when analyzed collectively by corresponding AI-based controllers in the repeater devices, may enable improved self-optimization of the network, enhancing performance, reliability, and adaptability across various deployment scenarios without relying on external calibration equipment or gNodeB connections.

In an example, the additional test parameters, such as signal propagation environment information, polarization information, detailed channel quality indicators, and advanced metrics like delay spread, jitter, and error vector magnitude, may not be typically part of the standard SSB structure of a real SSB typically communicated by the gNB 106. These additional parameters may be an expansion of the SSB concept for the specific purpose of the repeater system 100. By including these extra parameters in the pseudo-SSB signal, the repeater system 100 may allow for more comprehensive analysis and optimization of the repeater network, going beyond what would be possible with a standard SSB signal from a gNodeB. For example, in a scenario of deploying a repeater network in an urban environment with tall buildings and varying traffic patterns, with a standard SSB from a gNodeB, the conventional repeater devices may receive basic synchronization information and cell identifiers. Such conventional repeater devices may then align their timing and identify the serving cell but would have limited information about the specific propagation environment or dynamic conditions affecting signal quality. In contrast to the conventional systems, with the enhanced pseudo-SSB signal, the repeater system 100, the pseudo-SSB signal may include data about signal reflections from buildings and obstructions. This allows the plurality of repeater devices 102 to adapt their beam patterns to leverage beneficial reflections and mitigate obstructions. In another example, signal polarization may be affected by reflections. By including the polarization information, the plurality of repeater devices 102 may dynamically adjust their polarization to maintain optimal signal quality. Thus, by incorporating the additional test parameters, the repeater system 100 may perform one or more of: dynamically adjust its topology to optimize coverage as conditions change throughout the day, predict and preemptively address potential signal quality issues based on historical patterns, fine-tune power levels and beam patterns to minimize energy consumption while maintaining coverage, and adapt to temporary obstructions or changes in the environment without manual reconfiguration.

In accordance with an embodiment, the first repeater device 108 may further comprise the first AI-based controller 108B. The first processor 108A of the first repeater device 108 may be configured to pass the feedback to the first AI-based controller 108B to interpret the feedback received from the second repeater device 110A and automatically update the pseudo-SSB signal and the steering of the pseudo-SSB signal. The AI-based controller 108B may analyze the comprehensive set of signal assessment parameters provided in the feedback. This analysis may include evaluating parameters such as angle of arrival, received signal strength, timing offsets, and the additional test parameters like signal propagation environment information and beamforming feedback. Based on this interpretation, the AI-based controller 108B may dynamically adjust the pseudo-SSB signal parameters, such as beam ID, transmit power levels, and encoded information. Additionally, it may optimize the beam steering by fine-tuning the beamformer's phase shifters and amplitude controllers. This AI-driven approach enables the first repeater device 108 to adapt in real-time to changing environmental conditions, potential obstructions, and varying signal quality without manual intervention. By continuously refining the pseudo-SSB signal and its transmission based on feedback, the repeater system 100 may achieve optimal beam alignment, improved signal strength, and enhanced overall link quality. This self-optimizing capability may significantly reduce the need for manual calibration, streamline the deployment process, and allow the repeater network to maintain peak performance even in dynamic and challenging environments. Furthermore, the AI-based controller 108B ability to learn from historical data may enable predictive optimizations, anticipating potential issues before they impact network performance and ensuring consistent, high-quality connectivity across the entire repeater mesh network.

The first processor 108A of the first repeater device 108 may be further configured to pre-calibrate and establish a wireless link with the second repeater device 110A in the pre-connection stage independent of the gNB 106, based on the feedback received from the second repeater device 110A. This pre-calibration process may involve iterative adjustments of beam steering angles, transmit power levels, and other link parameters using the comprehensive feedback provided by the second repeater device 110A. The pre-calibration may be a pre-deployment calibration and verification that may occur before the plurality of repeater devices 102 are installed in their final locations. The first processor 108A, working with the first AI-based controller 108B, may use the pseudo-SSB signal to simulate real-world conditions and test the repeaters' performance. The first processor 108A, in conjunction with the first AI-based controller 108B, may analyze the received signal assessment parameters, including angle of arrival, received signal strength, timing offsets, and additional test parameters like signal-to-noise ratio and channel quality indicators. Based on this analysis, the first repeater device 108 may fine-tune its pseudo-SSB signal characteristics and transmission parameters to optimize the link quality. This pre-connection stage calibration may enable the first repeater device 108 and the second repeater device 110A to establish a robust wireless link without relying on an actual gNB 106 or expensive test equipment. This pre-deployment testing may identify and address any hardware or configuration issues before field installation without the gNB 106 or specialized test equipment. This approach may reduce on-site installation time, minimize the risk of deployment issues, and ensure that the plurality of repeater devices 102 are ready to form a self-organizing mesh network as soon as they are installed in the field. The pre-deployment calibration may also serve as a baseline for future performance comparisons, aiding in long-term network maintenance and troubleshooting.

In accordance with an embodiment, the first processor 108A of the first repeater device 108 may be further configured to iteratively adjust beam steering angles and transmit power levels for the pre-calibration of the wireless link with the second repeater device 110A in the pre-connection stage independent of the gNB 106. This iterative process of adjusting and transmitting of the power levels for the pre-calibration of the wireless link may involve the first repeater device 108 systematically varying its beam steering angles across its coverage sector while adjusting transmit power levels. For each configuration, the second repeater device 110A may provide feedback on signal quality metrics. The first processor 108A, in conjunction with the first AI-based controller 108B, may analyze this feedback to determine the optimal combination of beam angle and power level. This process may be repeated/iterated multiple times, with each iteration refining the previous results, to achieve the best possible link quality. By performing these adjustments in the pre-connection stage, the plurality of repeater devices 102 may establish optimal communication parameters before deployment, ensuring they are preconfigured for peak performance. Thus, the repeater system 100 may adapt to various potential deployment scenarios, such as different building layouts or environmental conditions, without requiring on-site manual tuning. The ability to fine-tune these parameters independently of the gNB 106 allows for more flexible and efficient network planning, as the plurality of repeater devices 102 may be optimized for their specific locations and roles within the network topology. Furthermore, this iterative pre-calibration process may serve as a valuable tool for network designers, providing insights into the expected performance and coverage patterns of the repeater network before actual field deployment.

In accordance with an embodiment, the second repeater device 110A may be further configured to execute an initial beam alignment and time division duplex (TDD) synch with the first repeater device 108 based on an exchange of the pseudo-SSB signal and the response pseudo-SSB signal among the first repeater device 108 and the second repeater device 110A. The execution of the initial beam alignment may begin with the second repeater device 110A receiving the pseudo-SSB signal from the first repeater device 108 across multiple beam directions. The second processor 112A and AI-based controller 112B may analyze the received signals to determine the optimal beam direction for communication with the first repeater device 108. Simultaneously, the second repeater device 110A may extract timing information from the pseudo-SSB signal to align its internal clock. It may then generate and transmit a response pseudo-SSB signal back to the first repeater device 108, incorporating its own timing information. This bidirectional exchange allows both repeaters to refine their beam alignment and establish a common time reference for TDD operation. By performing this synchronization using pseudo-SSB signals, the repeater devices may establish precise timing alignment without relying on an external time source or the gNB 106. This self-contained synchronization method enables the repeater network to maintain coherent TDD operation, useful for avoiding self-interference and maximizing spectral efficiency. The ability to establish this synchronization independently facilitates rapid network setup and allows for autonomous timing adjustments in response to changing network conditions or the addition of new repeater devices. This self-organizing capability enhances the scalability and flexibility of the repeater network, allowing it to adapt to various deployment scenarios while maintaining optimal performance.

In accordance with an embodiment, the first processor 108A of the first repeater device 108 may be further configured to modulate additional test parameters specific to the pre-connection stage in the pseudo-SSB signal to allow additional signal diagnostics at a plurality of other repeater devices including the second repeater device 110A, based on the feedback received from the second repeater device 110A or the plurality of other repeater devices. In accordance with an embodiment, the additional test parameters comprises three or more of: signal-to-noise ratio, bit error rate, carrier-to-interference ratio, a timing offset, a frequency offset, path loss information, reflection and scattering information, beamforming parameters, modulation and coding scheme information, temperature and environmental conditions, antenna alignment angles, phase and amplitude errors, a synchronization status, link budget information, an error vector magnitude, a noise figure, or signal strength measurements. The first processor 108A may strategically modulate these parameters within the pseudo-SSB signal structure, leveraging the flexibility of the FPGA or DSP implementation. For instance, it may introduce controlled variations in the signal-to-noise ratio or inject specific bit error patterns to assess the network's error correction capabilities. The first processor 108A may also adjust beamforming parameters and antenna alignment angles to evaluate the system's adaptive beamforming performance. The first processor 108A may dynamically adjust these parameters in the pseudo-SSB signal based on the specific testing requirements or environmental conditions. The receiving repeaters, such as the second repeater device 110A, may use their respective AI-based controllers (e.g., the AI-based controller 112B) to analyze these modulated parameters and provide comprehensive diagnostic feedback. This capability enables the repeater system 100 to simulate various real-world scenarios and stress conditions during the pre-connection stage, without the need for actual field deployment or connection to a gNB 106. By incorporating these additional diagnostics, the repeater system 100 may identify potential issues or limitations in the repeater network that may not be apparent under standard testing conditions.

In accordance with an embodiment, the first processor 108A of the first repeater device 108 may be further configured to calibrate and further propagate the pseudo-SSB signal across a plurality of other repeater devices including the second repeater device 110A to latch the plurality of other repeater devices onto a common reference for a network-wide calibration and synchronization without requiring any of the plurality of other repeater devices to connect to the gNB 106 or other gNBs. In this operation, the first repeater device 108 may act as a master node, which may generate and transmit the initial pseudo-SSB signal. As each subsequent repeater device receives this signal, it may calibrate its own timing and frequency references to align with the master node. The calibrated repeater devices in the plurality of repeater devices 102 may then propagate the pseudo-SSB signal further, extending the synchronization across the entire network in a daisy-chain manner. The first processor 108A, in conjunction with its AI-based controller 108B, may continuously monitor and adjust the propagation of the pseudo-SSB signal, ensuring that timing and frequency synchronization is maintained even as the signal traverse multiple hops. This self-organizing synchronization enables the creation of a coherent repeater mesh network without relying on external time sources or gNB connections. By establishing a common reference across the plurality of repeater devices 102, the repeater system 100 may maintain precise time division duplex (TDD) operations, useful for avoiding self-interference and maximizing spectral efficiency. The ability to achieve network-wide synchronization independently of gNBs significantly simplifies deployment processes, particularly in areas where gNB coverage is not yet established or in temporary network setups. This autonomous calibration capability enhances the flexibility and scalability of the repeater network, allowing for rapid deployment and easy expansion in various scenarios, from urban environments to emergency response situations, while maintaining optimal performance and minimizing interference.

In accordance with an embodiment, each of the plurality of repeater devices 102 may be calibrated and configured to form a self-calibrated mesh network by establishing one or more wireless links among the plurality of repeater devices 102 in the pre-connection stage independent of the gNB 106. This process may be initiated by the first repeater device 108, which has the unique capability to generate the pseudo-SSB signal. The first repeater device 108 may transmit this pseudo-SSB signal, which is then received by the other repeaters in the network, including the second repeater device 110A. These other repeaters, being "dumb" grab and forward devices, may not generate their own pseudo-SSB signals but instead may analyze the received signal and adjust their parameters accordingly. Based on the feedback received from these other repeaters, the first repeater device 108 may iteratively adjust its beam steering angles and transmit power levels to optimize the links. This process may allow for the establishment of a self-calibrated mesh network without requiring each repeater to have sophisticated signal generation capabilities. By utilizing a single source of the pseudo-SSB signal, the repeater system 100 may achieve network-wide calibration and synchronization more efficiently, reducing the complexity and cost of individual repeater units while still enabling rapid deployment of a high-performance mesh network independent of gNB 106 connections.

In accordance with an embodiment, each of the plurality of repeater devices 102 including the first repeater device 108 and the second repeater device 110A may be configured to re-generate a self-calibrated mesh network by establishing one or more wireless links among the plurality of repeater devices 102 when the plurality of repeater devices 102 are deployed at a different geographical area, and wherein at least one of the plurality of repeater devices 102 is configured to connect to a new gNB 106 when the plurality of repeater devices 102 are deployed at the different geographical area, and the new gNB 106 is set as the source of the SSB signal for the at least one of the plurality of repeater devices 102. This capability allows for the flexible redeployment of the repeater network in various locations without requiring extensive reconfiguration. When moved to a new area, the first repeater device 108 may initiate the calibration process by generating the pseudo-SSB signal, allowing the network to self-organize in the new environment. Additionally, at least one of the plurality of repeater devices 102 may be configured to connect to a new gNB in the different geographical area, with this new gNB set as the source of the SSB signal for that repeater. This feature enables seamless integration of the pre-calibrated repeater network with the existing 5G infrastructure in the new location. The ability to switch from using the pseudo-SSB signal to an actual gNB signal demonstrates the system's adaptability to different deployment scenarios. By maintaining the self-calibration capabilities while allowing for connection to local gNBs, the repeater system 100 combines the benefits of rapid, autonomous deployment with the ability to integrate into established networks. This dual-mode operation enhances the versatility of the repeater network, making it suitable for a wide range of applications from temporary event coverage to permanent infrastructure expansion in new areas. The repeater system 102 may adapt to new geographical areas and network conditions without requiring individual repeater reconfiguration significantly reduces deployment time and operational complexity in varied and changing environments.

In accordance with an embodiment, the first repeater device 108 may be communicatively coupled to an external electronic device 114. One or more pseudo-SSB signal parameters of the pseudo-SSB signal may be remotely configurable and customizable via a user interface rendered on the external electronic device 114. The remote configuration and customization of the one or more pseudo-SSB signal parameters of the pseudo-SSB signal may enable network operators or technicians to fine-tune the pseudo-SSB signal characteristics without physical access to the repeater hardware. The external electronic device 114, which could be a smartphone, tablet, or laptop, may provide a user-friendly interface for adjusting parameters such as beam ID, transmit power levels, timing information, and bandwidth settings. By allowing remote configuration, the repeater system 100 may facilitate real-time optimization of the repeater network based on specific deployment needs or changing environmental conditions. The pseudo-SSB signal's parameters may be modified to simulate various scenarios, test network resilience, or adapt to unique geographical challenges. This remote customization capability enhances the flexibility of the repeater system, enabling rapid response to performance issues or network optimization requirements without on-site visits. Furthermore, a centralized management of multiple repeater networks may be achieved, enabling consistent configuration across different deployment sites and facilitating large-scale network optimization strategies.

In accordance with an embodiment, the pseudo-SSB signal may be transmitted with dual polarization across the multiple directions, and the feedback received from the second repeater device 110A may include measurements of both polarizations. The dual polarization transmission capability may leverage a phased array antenna in 5G repeaters, which may incorporate both vertical and horizontal polarization elements. The first repeater device 108 may generate the pseudo-SSB signal and transmit it using both vertical and horizontal polarizations simultaneously. This dual-polarized transmission allows the signal to propagate more effectively through various environmental conditions and obstacles. As the pseudo-SSB signal is steered across multiple directions to cover the sector of the first repeater device 108, each direction benefits from this dual polarization approach. The second repeater device 110A, upon receiving the dual-polarized pseudo-SSB signal, may analyze and measure both polarization components independently. This comprehensive analysis enables a more detailed assessment of the signal propagation characteristics. The feedback provided by the second repeater device 110A to the first repeater device 108 may include distinct measurements for each polarization, such as signal strength, phase information, and polarization-specific channel quality indicators. By utilizing both polarizations, the repeater system 100 may maintain stronger and more reliable links in environments where one polarization might be subject to fading or interference. In favorable conditions, dual polarization can effectively double the channel capacity by concurrently transmitting two independent data streams on orthogonal polarizations. Further, different polarizations may interact differently with various materials and obstacles in the signal path. By using both, the repeater system 100 may increase the likelihood of maintaining a strong signal in complex environments. Furthermore, with feedback on both polarizations, the repeater system 100 may dynamically adjust its transmission polarization to match the best-performing polarization for each link, optimizing signal quality and range. Additionally, the use of dual polarization in the pre-connection stage allows the repeater system 100 to pre-emptively identify and address polarization-dependent issues that might arise in the actual network deployment. This proactive approach may significantly reduce the time and effort required for post-deployment troubleshooting and optimization.

Figure 2:
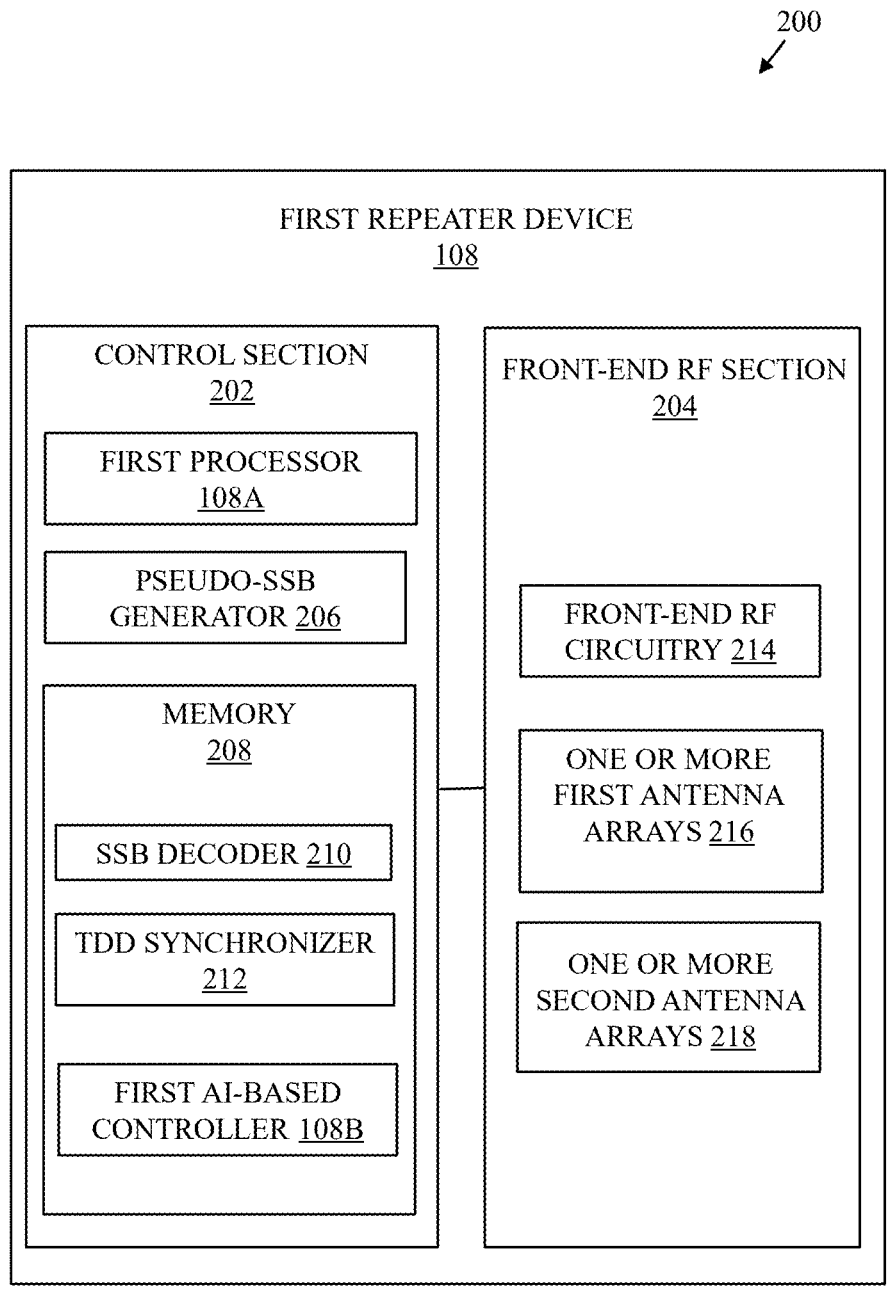
FIG. 2 is a block diagram that illustrates various components of an exemplary first repeater device of a repeater system, in accordance with an exemplary embodiment of the disclosure.

FIG. 2 is a block diagram that illustrates various components of an exemplary first repeater device of a repeater system, in accordance with an exemplary embodiment of the disclosure. FIG. 2 is explained in conjunction with elements from FIG. 1. With reference to FIG. 2, there is shown a block diagram 200 of the first repeater device 108. The first repeater device 108 may include a control section 202 and a front-end radio frequency (RF) section 204. The control section 202 may include the first processor 108A, a pseudo-SSB generator 206, and a memory 208. The control section 202 may be communicatively coupled to the front-end RF section 204. The front-end RF section 204 may include front-end RF circuitry 214 and a plurality of antenna arrays, such as one or more first antenna arrays 216 and one or more second antenna arrays 218. The memory 208 may include an SSB decoder 210, a TDD synchronizer 212, and the first AI-based controller 108B.

The first repeater device 108 may be the first type of repeater device capable of generating the pseudo-SSB signal using the pseudo-SSB generator 206. The first processor 108A may be communicatively coupled to the memory 208 and the front-end RF section 204 including the front-end RF circuitry 214, the one or more first antenna arrays 216, and the one or more second antenna arrays 218. The first processor 108A may be configured to execute various operations of the first repeater device 108. The first processor 108A may be configured to control various components of the front-end RF section 204. The first repeater device 108 may be a programmable device, where the first processor 108A may execute instructions stored in the memory 208. Example of the implementation of the first processor 108A may include, but are not limited to the FPGA, an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

In an implementation, the pseudo-SSB generator 206 may be a pseudo-SSB signal generation circuit. In another implementation, the pseudo-SSB generator 206 may be implemented in the FPGA as SSB generation logic. The pseudo-SSB may be generated to mimic a gNodeB SSB signal, allowing for network setup, calibration, and testing without the need for actual 5G base station or special equipment. The generated pseudo-SSB signal may be a standard-compliant SSB signal e.g., 3rd Generation Partnership Project (3GPP) compliant, Internet Engineering Task Force (IETF) compliant as well as International Telecommunication Union (ITU) compliant.

The memory 208 may be configured store a source indicator indicative of source of the Synchronization Signal Block (SSB) signal, i.e., whether the source is the first repeater device 108 or a gNB, such as the gNB 106. The memory 208 may be further configured to store the plurality of signal assessment parameters as a part of the feedback received from the second repeater device 110A. Examples of the implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It should be understood by a person having ordinary skill in the art that the control section 202 may further include one or more other components, such as an analog to digital converter (ADC), a digital to analog (DAC) converter, a 5G cellular modem, and the like, known in the art, which are omitted for brevity.

The SSB decoder 210 may be implemented as a circuitry, logic, or interface configured to process received SSB signals (whether pseudo-SSB signal originated from the first repeater device 108 or originated from a base station, such as a gNB).

The TDD synchronizer 212 may be implemented as a circuitry, logic, or interface configured to maintain timing alignment between the plurality of repeater device 102.

The front-end RF circuitry 214 includes receiver circuitry and transmitter circuitry. The receiver circuitry is coupled to the one or more receiving antenna arrays, such as one of the one or more first antenna arrays 216 or the one or more second antenna arrays 218 may be a part of the receiver chain. The transmitter circuitry may be coupled to the one or more transmitting antenna arrays, such as the one or more first antenna arrays 216 or the one or more second antenna arrays 218 in an implementation. The front-end RF circuitry 214 supports millimeter wave (mmWave) communication as well communication at a sub 6 gigahertz (GHz) frequency.

Each of the one or more first antenna arrays 216 and the one or more second antenna arrays 116 may be one of an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but is not limited to, a linear phased array antenna, a planar phased array antenna, a frequency scanning phased array antenna, a dynamic phased array antenna, and a passive phased array antenna. In an implementation, the one or more first antenna arrays 216 may be donor antenna array, which may be connected to the gNB 106 when deployed after pre-deployment calibration and testing. The one or more second antenna arrays 218 may be service antenna arrays that may communicate one or more beams of RF signals to establish one or more wireless links to one or more surrounding network nodes or mesh nodes, such as the second repeater device 110A.

In an alternative embodiment, the first AI-based controller 108B in the first repeater device 108 may be configured to inject the pseudo-SSB signal into one polarization for testing and diagnostics, while simultaneously allowing the other polarization to relay data to and from the gNB 106. This sophisticated dual use of polarizations may enable continuous network operation alongside real-time diagnostics and optimization. The AI-based controller 108B may dynamically generate and inject test SSB signals with varying parameters into, for example, the vertical polarization, allowing for ongoing assessment of link quality, environmental changes, and repeater performance. Concurrently, the horizontal polarization may maintain normal data relay functions, ensuring uninterrupted service. This approach may additionally provide several benefits, for example, it may allow for proactive network optimization without service interruption, enable the detection of polarization-specific issues or interference, and facilitate adaptive responses to changing environmental conditions. The AI-based controller 108B may analyze the feedback from these test signals, received by other repeaters like the second repeater device 110A, to fine-tune network parameters in real-time. This capability may significantly enhance the network's resilience, adaptability, and overall performance, while minimizing the need for scheduled downtime for testing and diagnostic procedures. In an example, the first repeater device 108 may maintain its connection to the gNB 106 using one polarization (e.g., vertical), ensuring continuous network operation and data relay. Concurrently, the AI-based controller 108B may inject the generated pseudo-SSB signal into the other polarization (e.g., horizontal) for internal testing and diagnostics of the mesh network. This approach may allow for comprehensive testing of mesh connectivity before full integration with the gNB 106. Furthermore, this embodiment may allow for continuous adaptation of the mesh network to changing environmental conditions or user demands, even while the network is live and operational. It may further allow to maintain optimal service quality while continuously refining and expanding the mesh network, ultimately leading to more robust and efficient 5G infrastructure deployments.

Training of AI-based controller 108B: In an exemplary implementation, the first AI-based controller 108B in the repeater system 100 may be trained using a multi-faceted approach to ensure robust and adaptive performance across various network scenarios. Initially, the first AI-based controller 108B may be trained on a large dataset of simulated network configurations, including diverse environmental conditions, repeater layouts, and user density patterns. This supervised learning phase may help the first AI-based controller 108B (e.g., a neural network model) develop a foundational understanding of optimal network parameters for different scenarios. The training process may then transition to a reinforcement learning phase, where the AI-based controller 108B may continuously refine its decision-making processes based on real-world feedback from the repeater network. The first AI-based controller 108B may use the feedback received from other repeater devices of the plurality of repeater devices 102, such as signal strength measurements, timing offsets, and channel quality indicators, as input for its learning algorithms. The first AI-based controller 108B may adjust the pseudo-SSB signal parameters, beam steering angles, and power levels, treating these adjustments as actions in a reinforcement learning framework. The resulting network performance metrics, such as improved signal quality, reduced interference, or enhanced coverage area, may serve as rewards to guide the first AI-based controller 108B learning process.

In accordance with an embodiment, to enhance adaptability, the training may incorporate transfer learning techniques, allowing the AI-based controller 108B to quickly adapt to new deployment scenarios or geographical areas. This approach may enable the first AI-based controller 108B to leverage knowledge gained from previous deployments when optimizing new repeater networks. The training may also focus on multi-objective optimization, teaching the first AI-based controller 108B to balance factors such as signal strength, coverage area, energy efficiency, and network capacity simultaneously. Furthermore, the training process may include adversarial scenarios to improve the first AI-based controller 108B robustness. This may involve simulating challenging conditions such as sudden changes in network topology, interference from external sources, or hardware failures. The AI-based controller 108B may learn to detect and mitigate these issues, enhancing the overall resilience of the repeater network. The training may also incorporate federated learning techniques, allowing multiple AI-based controllers, such as the second AI-based controller 112B, in different repeater networks to share insights without exchanging raw data, potentially improving the collective performance of repeater systems across various deployments while maintaining data privacy. Lastly, the training process may include a continual learning component, where the AI-based controller 108B may periodically update its models based on new data and experiences, ensuring that it remains effective as network conditions and technologies evolve over time. This comprehensive and ongoing training approach may result in an AI-based controller 108B capable of dynamically optimizing the repeater network's performance across a wide range of operational conditions and deployment scenarios, while continuously improving its capabilities.

Figure 3:
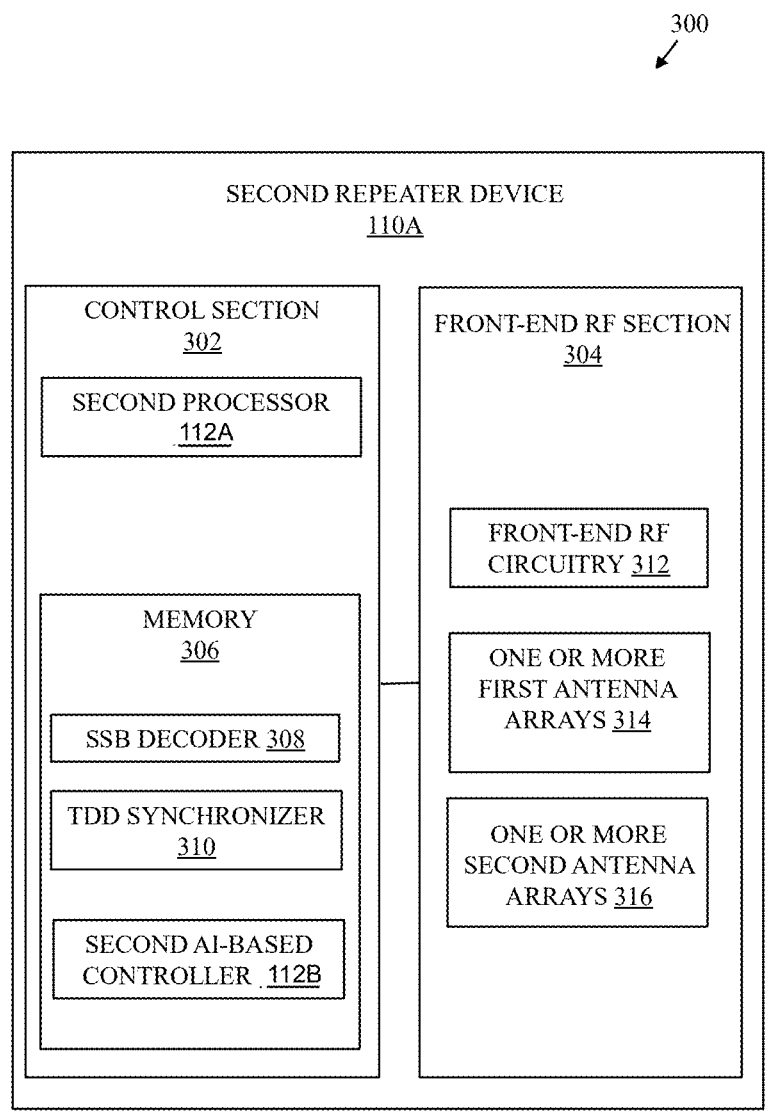
FIG. 3 is a block diagram that illustrates various components of an exemplary second repeater device of a repeater system, in accordance with an exemplary embodiment of the disclosure.

FIG. 3 is a block diagram that illustrates various components of an exemplary second repeater device of a repeater system, in accordance with an exemplary embodiment of the disclosure. FIG. 3 is explained in conjunction with elements from FIGS. 1 and 2. With reference to FIG. 3, there is shown a block diagram 300 of the second repeater device 110A. The second repeater device 110A may include a control section 302 and a front-end radio frequency (RF) section 304. The control section 302 may include the second processor 112A, and a memory 306. The control section 302 may be communicatively coupled to the front-end RF section 304. The front-end RF section 304 may include front-end RF circuitry 312 and a plurality of antenna arrays, such as one or more first antenna arrays 314 and one or more second antenna arrays 316. The memory 306 may include an SSB decoder 308, a TDD synchronizer 310, and the second AI-based controller 112B.

The second repeater device 110A may be the second type of repeater device not configured to or not capable of generating the pseudo-SSB signal. All other components of the second repeater device 110A may be same or similar to that of the first repeater device 108 except that the second repeater device 110A may not include a pseudo-SSB generator. For example, the implementation of the memory 306, the SSB decoder 308, the TDD synchronizer 310, the second AI-based controller 112B, the front-end RF circuitry 312, the one or more first antenna arrays 314, or the one or more second antenna arrays 316 may be the same as that of the memory 208, the SSB decoder 210, the TDD synchronizer 212, the first AI-based controller 108B, the front-end RF circuitry 214, the one or more first antenna arrays 216, or the one or more second antenna arrays 218, respectively of FIG. 2. Further, the second AI-based controller 112B may be trained similar to that of the first AI-based controller 108B.

Figure 4A:
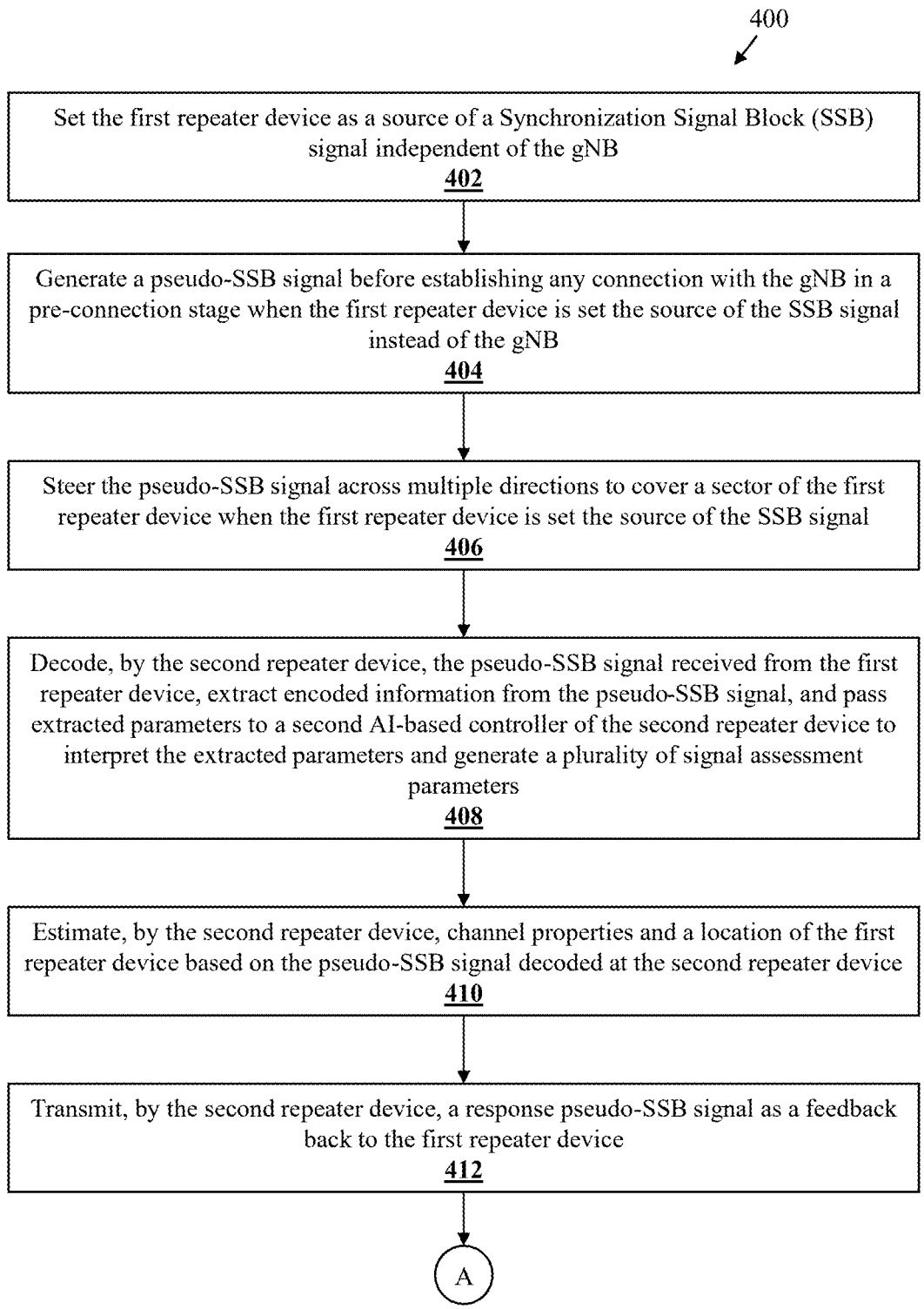
FIGS. 4A, 4B, and 4C collectively, is a flowchart of a method of pre-calibrating repeater devices using pseudo-Synchronization Signal Block (SSB) signal for high-performance communication, in accordance with an embodiment of the disclosure.
Figure 4B:
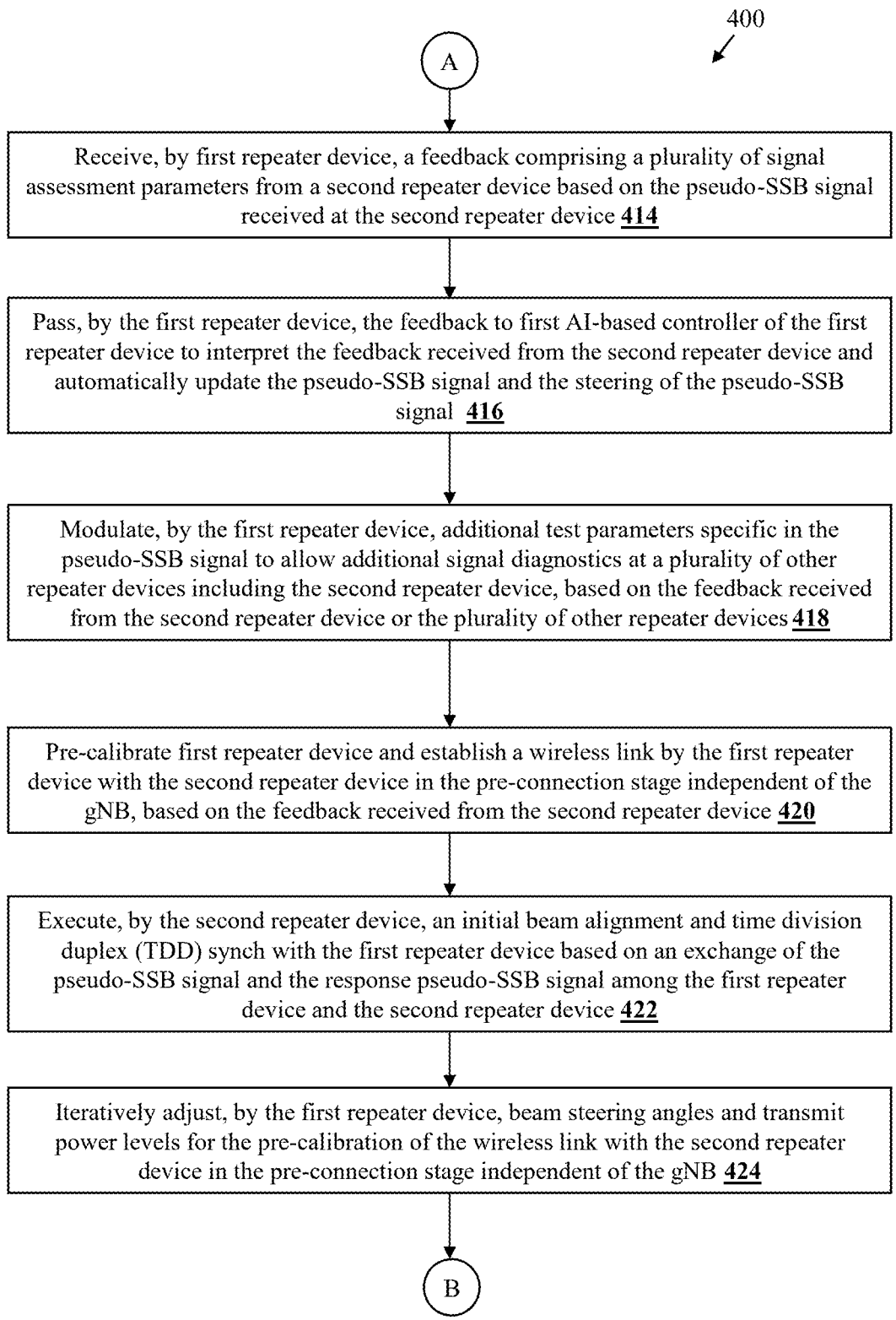
Figure 4C:
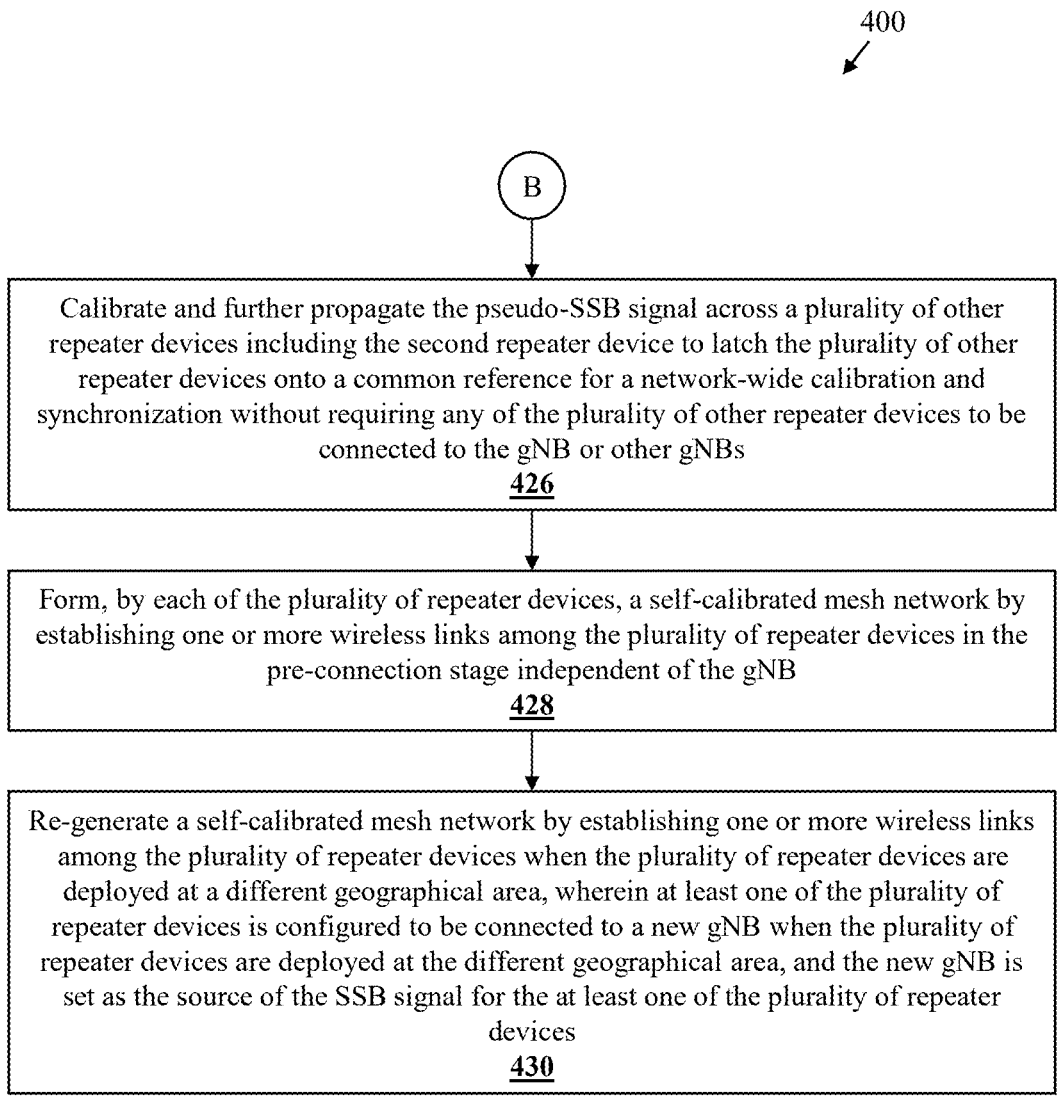

FIGS. 4A, 4B, and 4C collectively, is a flowchart of a method of pre-calibrating repeater devices using pseudo-Synchronization Signal Block (SSB) signal for high-performance communication, in accordance with an embodiment of the disclosure. FIGS. 4A to 4C are explained in conjunction with elements from FIGS. 1, 2, and 3. With reference to FIGS. 4A, 4B, and 4C, there is shown a flowchart of a method 400 comprising exemplary operations 402 through 430. The method 400 may be implemented in the repeater system 100. For example, the operations 402, 404, 406, 414, 416, 418, 420, 424, and 426 may be implemented in the first repeater device 108, the operations 408, 410, 412, 422, may be implemented in the second repeater device 110A, and the operations 428 and 430 may be implemented in the repeater system 100 and controlled or facilitated by one or more repeater devices of the plurality of repeater devices 102.

At 402, the first repeater device 108 may be set as a source of a Synchronization Signal Block (SSB) signal independent of the gNB 106. The first processor 108A may be configured to set the first repeater device 108 as the source of the SSB signal independent of the gNB 106.

At 404, a pseudo-SSB signal may be generated before establishing any connection with the gNB 106 in a pre-connection stage when the first repeater device 108 is set the source of the SSB signal instead of the gNB 106. The first processor 108A may be further configured to generate the pseudo-SSB signal before establishing any connection with the gNB 106 in the pre-connection stage.

At 406, the pseudo-SSB signal may be steered across multiple directions to cover a sector of the first repeater device 108 when the first repeater device 108 is set as the source of the SSB signal. The first processor 108A of the first repeater device 108 may be further configured to steer the pseudo-SSB across multiple directions to cover a sector of the first repeater device 108.

At 408, the pseudo-SSB signal received by the second repeater device 110A from the first repeater device 108 may be decoded, the encoded information from the pseudo-SSB signal may be extracted, and the extracted parameters may be passed to the second AI-based controller 112B of the second repeater device 110A to interpret the extracted parameters and generate a plurality of signal assessment parameters. The second processor 112A may be configured to decode the pseudo-SSB signal received from the first repeater device 108, extract encoded information from the pseudo-SSB signal, and pass extracted parameters to the second AI-based controller 112B to interpret the extracted parameters and generate the plurality of signal assessment parameters.

At 410, channel properties and the location of the first repeater device 108 may be estimated by the second repeater device 110A based on the pseudo-SSB signal decoded at the second repeater device 110A.

At 412, a response pseudo-SSB signal may be transmitted by the second repeater device 110A as a feedback back to the first repeater device 108.

At 414, a feedback comprising a plurality of signal assessment parameters may be received by the first repeater device 108 from the second repeater device 110A based on the pseudo-SSB signal received at the second repeater device 110A.

At 416, the feedback may be passed to the first AI-based controller 108B of the first repeater device 108 to interpret the feedback received from the second repeater device 110A and automatically update the pseudo-SSB signal and the steering of the pseudo-SSB signal. The second processor 112A may be further configured to pass the feedback to the first AI-based controller 108B of the first repeater device 108 to interpret the feedback.

At 418, additional test parameters specific may be modulated by the first repeater device 108 in the pseudo-SSB signal to allow additional signal diagnostics at a plurality of other repeater devices including the second repeater device 110A, based on the feedback received from the second repeater device 110A or the plurality of other repeater devices.

At 420, the first repeater device 108 may be pre-calibrated and a wireless link may be established by the first repeater device 108 with the second repeater device 110A in the pre-connection stage independent of the gNB 106, based on the feedback received from the second repeater device 110A.

At 422, an initial beam alignment and time division duplex (TDD) synch may be executed by the second repeater device 110A with the first repeater device 108 based on an exchange of the pseudo-SSB signal and the response pseudo-SSB signal among the first repeater device 108 and the second repeater device 110A.

At 424, beam steering angles and transmit power levels may be iteratively adjusted by the first repeater device 108 for the pre-calibration of the wireless link with the second repeater device 110A in the pre-connection stage independent of the gNB 106.

At 426, the pseudo-SSB signal may be calibrated and further propagated across a plurality of other repeater devices including the second repeater device 110A to latch the plurality of other repeater devices onto a common reference for a network-wide calibration and synchronization without requiring any of the plurality of other repeater devices to connect to the gNB 106 or other gNBs.

At 428, a self-calibrated mesh network may be formed by each of the plurality of repeater devices 102 by establishing one or more wireless links among the plurality of repeater devices 102 in the pre-connection stage independent of the gNB 106.

At 430, a self-calibrated mesh network may be re-generated by establishing one or more wireless links among the plurality of repeater devices 102 when the plurality of repeater devices 102 are deployed at a different geographical area, where at least one of the plurality of repeater devices 102 is configured to connect to a new gNB 106 when the plurality of repeater devices 102 are deployed at the different geographical area, and the new gNB 106 is set as the source of the SSB signal for the at least one of the plurality of repeater devices 102.

Various embodiments of the disclosure may provide a repeater system 100. The repeater system 100 that may include the first repeater device 108 that may comprise the first processor 108A. The first processor 108A may be configured to set the first repeater device 108 as a source of a Synchronization Signal Block (SSB) signal independent of the gNB 106. The first processor 108A may be further configured to generate a pseudo-SSB signal before establishing any connection with the gNB 106 in a pre-connection stage when the first repeater device 108 is set the source of the SSB signal instead of the gNB 106. The first processor 108A may be configured to steer the pseudo-SSB signal across multiple directions to cover a sector of the first repeater device 108 when the first repeater device 108 is set the source of the SSB signal. The first processor 108A may be configured to receive a feedback comprising a plurality of signal assessment parameters from a second repeater device 110A based on the pseudo-SSB signal received at the second repeater device 110A. The first processor 108A may be configured to pre-calibrate and establish a wireless link with the second repeater device 110A in the pre-connection stage independent of the gNB 106, based on the feedback received from the second repeater device 110A.

Various embodiments of the disclosure may provide a computer program product for wireless communication, the computer program product comprising a computer-readable storage medium (e.g., a non-transitory computer-readable storage medium) having program instructions embodied therewith, the program instructions are executable by a system to cause the system to execute operations, the operations comprising setting the first repeater device 108 as a source of a Synchronization Signal Block (SSB) signal independent of a gNode base station (gNB 106). The operations may further comprise generating a pseudo-SSB signal before establishing any connection with the gNB 106 in a pre-connection stage when the first repeater device 108 is set the source of the SSB signal instead of the gNB 106. The operations may further comprise steering the pseudo-SSB signal across multiple directions to cover a sector of the first repeater device 108 when the first repeater device 108 is set the source of the SSB signal. The operations may further comprise receiving a feedback comprising a plurality of signal assessment parameters from a second repeater device 110A based on the pseudo-SSB signal received at the second repeater device 110A. The operations may further comprise pre-calibrating the first repeater device 108 and establishing a wireless link with the second repeater device 110A in the pre-connection stage independent of the gNB 106, based on the feedback received from the second repeater device 110A.

While various embodiments described in the present disclosure have been described above, it should be understood that they have been presented by way of example, and not limitation. It should be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It should be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A repeater system, comprising:
   a first repeater device comprising a first processor, wherein the first processor is configured to:
   set the first repeater device as a source of a Synchronization Signal Block (SSB) signal independent of a gNode base station (gNB);
   generate a pseudo-SSB signal before establishing any connection with the gNB in a pre-connection stage when the first repeater device is set the source of the SSB signal instead of the gNB;
   steer the pseudo-SSB signal across multiple directions to cover a sector of the first repeater device when the first repeater device is set the source of the SSB signal;
   receive a feedback comprising a plurality of signal assessment parameters from a second repeater device based on the pseudo-SSB signal received at the second repeater device; and
   pre-calibrate and establish a wireless link with the second repeater device in the pre-connection stage independent of the gNB, based on the feedback received from the second repeater device.

2. The repeater system of claim 1, wherein the pseudo-SSB signal comprises encoded parameters including a pseudo physical cell identifier, a beam identifier, a channel bandwidth parameter, a timing information parameter, and a transmit (Tx) power level.

3. The repeater system of claim 1, wherein the first processor of the first repeater device is further configured to modulate additional test parameters specific to the pre-connection stage in the pseudo-SSB signal to allow additional signal diagnostics at a plurality of other repeater devices including the second repeater device, based on the feedback received from the second repeater device or the plurality of other repeater devices.

4. The repeater system of claim 3, wherein the additional test parameters comprises three or more of: signal-to-noise ratio, bit error rate, carrier-to-interference ratio, a timing offset, a frequency offset, path loss information, reflection and scattering information, beamforming parameters, modulation and coding scheme information, temperature and environmental conditions, antenna alignment angles, phase and amplitude errors, a synchronization status, link budget information, an error vector magnitude, a noise figure, or signal strength measurements.

5. The repeater system of claim 1, wherein the first processor of the first repeater device is further configured to calibrate and further propagate the pseudo-SSB signal across a plurality of other repeater devices including the second repeater device to latch the plurality of other repeater devices onto a common reference for a network-wide calibration and synchronization without requiring any of the plurality of other repeater devices to connect to the gNB or other gNBs.

6. The repeater system of claim 1, wherein the first processor of the first repeater device is further configured to iteratively adjust beam steering angles and transmit power levels for the pre-calibration of the wireless link with the second repeater device in the pre-connection stage independent of the gNB.

7. The repeater system of claim 1, wherein the first repeater device further comprises a first Artificial Intelligence (AI)-based controller, and wherein the first processor of the first repeater device is configured to pass the feedback to the first AI-based controller to interpret the feedback received from the second repeater device and automatically update the pseudo-SSB signal and the steering of the pseudo-SSB signal.

8. The repeater system of claim 1, wherein the second repeater device comprises a second processor and a second artificial intelligence (AI)-based controller, and wherein the second processor is configured to decode the pseudo-SSB signal received from the first repeater device, extract encoded information from the pseudo-SSB signal, and pass extracted parameters to the second AI-based controller to interpret the extracted parameters and generate the plurality of signal assessment parameters.

9. The repeater system of claim 8, wherein the plurality of signal assessment parameters in the feedback comprises two or more of: an angle of arrival, a received signal strength, a timing offset, or a frequency offset.

10. The repeater system of claim 9, wherein the plurality of signal assessment parameters further comprises additional test parameters including two or more of: signal propagation environment information including signal reflection information and signal obstruction information, a signal-to-noise ratio, a bit error rate, polarization information indicative of a polarization type of received signal, a channel quality indicator, a path loss, phase shift information, a delay spread, a jitter, a modulation error ratio indicative of an assessment of a deviation of the received signal from an expected modulation scheme, a packet loss rate, a link latency indicative of a time delay in a signal propagation between two repeaters, an interference level, a spectral efficiency, a beamforming feedback, a doppler shift when one of the first repeater device or the second repeater device is movable, or an error vector magnitude.

11. The repeater system of claim 1, wherein the first repeater device is communicatively coupled to an external electronic device, and wherein one or more pseudo-SSB signal parameters of the pseudo-SSB signal is remotely configurable and customizable via a user interface rendered on the external electronic device.

12. The repeater system of claim 1, wherein the pseudo-SSB signal is transmitted with dual polarization across the multiple directions, and the feedback received from the second repeater device includes measurements of both polarizations.

13. The repeater system of claim 1, wherein the second repeater device is further configured to:

estimate channel properties and a location of the first repeater device based on the pseudo-SSB signal decoded at the second repeater device; and transmit a response pseudo-SSB signal as the feedback back to the first repeater device; and execute an initial beam alignment and time division duplex (TDD) synch with the first repeater device based on an exchange of the pseudo-SSB signal and the response pseudo-SSB signal among the first repeater device and the second repeater device.

14. The repeater system of claim 1, further comprises a plurality of repeater devices including the first repeater device and the second repeater device, wherein each of the plurality of repeater devices is calibrated and configured to form a self-calibrated mesh network by establishing one or more wireless links among the plurality of repeater devices in the pre-connection stage independent of the gNB.

15. The repeater system of claim 14, wherein each of the plurality of repeater devices including the first repeater device and the second repeater device is configured to re-generate the self-calibrated mesh network by establishing the one or more wireless links among the plurality of repeater devices when the plurality of repeater devices are deployed at a different geographical area, and wherein at least one of the plurality of repeater devices is configured to connect to a new gNB when the plurality of repeater devices are deployed at the different geographical area, and the new gNB is set as the source of the SSB signal for the at least one of the plurality of repeater devices.

16. A method, comprising:
in a first repeater device:
setting the first repeater device as a source of a Synchronization Signal Block (SSB) signal independent of a gNode base station (gNB);
generating a pseudo-SSB signal before establishing any connection with the gNB in a pre-connection stage when the first repeater device is set the source of the SSB signal instead of the gNB;
steering the pseudo-SSB signal across multiple directions to cover a sector of the first repeater device when the first repeater device is set the source of the SSB signal;
receiving a feedback comprising a plurality of signal assessment parameters from a second repeater device based on the pseudo-SSB signal received at the second repeater device; and
pre-calibrating the first repeater device and establishing a wireless link with the second repeater device in the pre-connection stage independent of the gNB, based on the feedback received from the second repeater device.

17. The method of claim 16, further comprising calibrating and further propagating the pseudo-SSB signal across a plurality of other repeater devices including the second repeater device to latch the plurality of other repeater devices onto a common reference for a network-wide calibration and synchronization without requiring any of the plurality of other repeater devices to connect to the gNB or other gNBs.

18. The method of claim 16, further comprising modulating additional test parameters specific to the pre-connection stage in the pseudo-SSB signal to allow additional signal diagnostics at a plurality of other repeater devices including the second repeater device, based on the feedback received from the second repeater device or the plurality of other repeater devices.

19. The method of claim 16, further comprising passing the feedback to a first Artificial Intelligence (AI)-based controller of the first repeater device to interpret the feedback received from the second repeater device and automatically updating the pseudo-SSB signal and the steering of the pseudo-SSB signal.

20. A computer program product for pre-calibrating repeater devices, the computer program product comprising a non-transitory computer-readable storage medium having program instructions embodied therewith, the program instructions are executable by a system to cause the system to execute operations, the operations comprising:
- setting a first repeater device as a source of a Synchronization Signal Block (SSB) signal independent of a gNode base station (gNB);
- generating, by the first repeater device, a pseudo-SSB signal before establishing any connection with the gNB in a pre-connection stage when the first repeater device is set the source of the SSB signal instead of the gNB;
- steering, by the first repeater device, the pseudo-SSB signal across multiple directions to cover a sector of the first repeater device when the first repeater device is set the source of the SSB signal;
- receiving, by the first repeater device, a feedback comprising a plurality of signal assessment parameters from a second repeater device based on the pseudo-SSB signal received at the second repeater device; and
- pre-calibrating and establishing, by first repeater device, a wireless link with the second repeater device in the pre-connection stage independent of the gNB, based on the feedback received from the second repeater device.

* * * * *